United States Patent [19]
Hodges

[11] Patent Number: 5,190,320
[45] Date of Patent: Mar. 2, 1993

[54] TELESCOPING CLOSET FLANGE

[76] Inventor: B. Eugene Hodges, 761 Palmer Dr., Greenville, Mich. 48838

[21] Appl. No.: 819,795

[22] Filed: Jan. 13, 1992

[51] Int. Cl.$^5$ .............................................. F16L 23/00
[52] U.S. Cl. ...................................... 285/56; 285/42; 285/338
[58] Field of Search ................... 285/56, 42, 338, 341

[56] References Cited

U.S. PATENT DOCUMENTS

| | | | |
|---|---|---|---|
| 795,444 | 7/1905 | Kales | 285/338 X |
| 3,010,740 | 11/1961 | Dilley | 285/341 |
| 3,369,828 | 2/1968 | Trichey | 285/338 X |
| 3,800,486 | 4/1974 | Harvey | 285/56 X |
| 5,052,726 | 10/1991 | Logsdon | 285/56 X |

Primary Examiner—Richard E. Moore
Attorney, Agent, or Firm—Bullwinkel Partners, Ltd.

[57] ABSTRACT

A telescoping closet flange for bringing a vertical drain pipe even with the level of a concrete floor comprises a cylindrical body, a seal, a slide and a seal cap held together by fastening members. Prior to pouring the concrete floor, a spacer sleeve is fitted over the drain pipe so that, when removed, sufficient space is left for the telescoping closet flange. After the concrete has set, the spacer sleeve is removed and the telescoping closet flange is placed over the drain pipe. The flange may be slid up or down along the drain pipe to achieve the desired height. By tightening a set of shoulder bolts and nuts, a water tight seal is formed between the flange and the drain pipe.

7 Claims, 4 Drawing Sheets

Fig. 6
Fig. 7
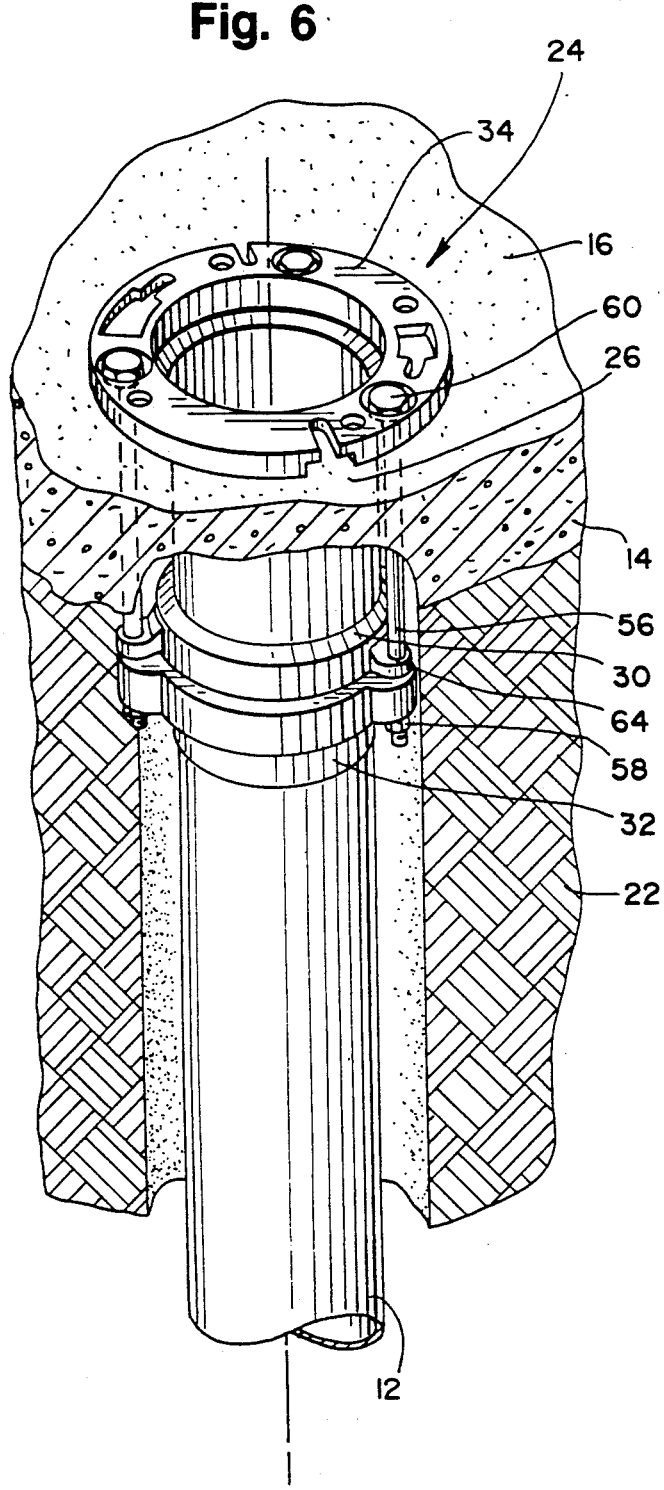
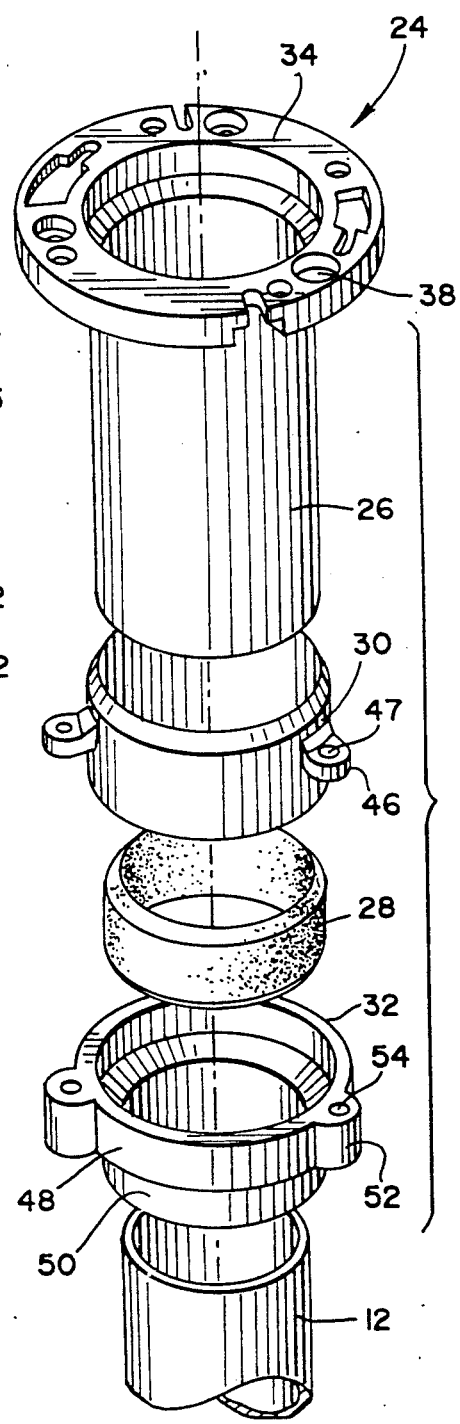

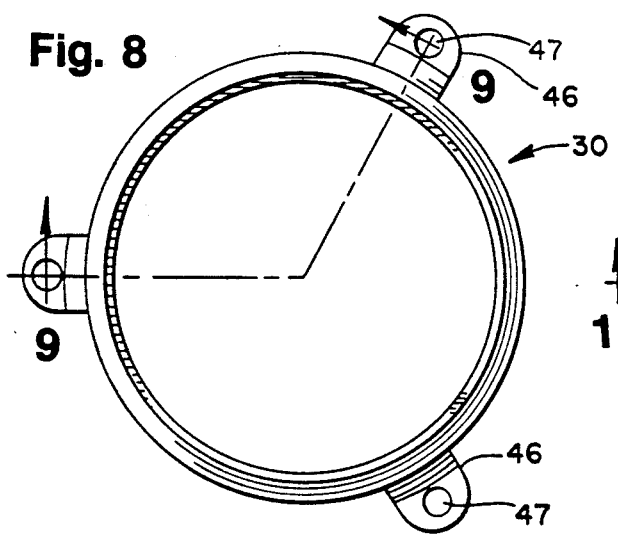
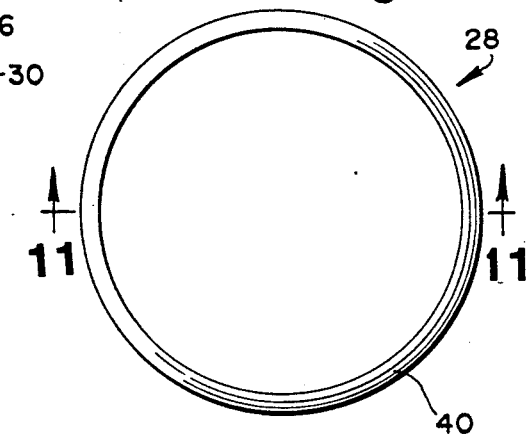
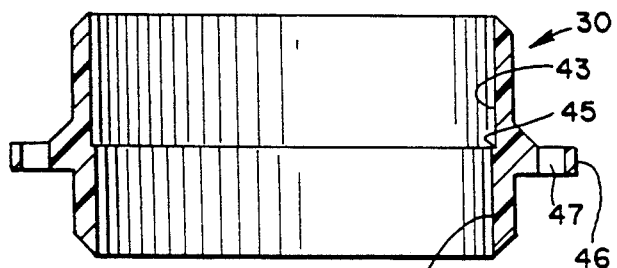
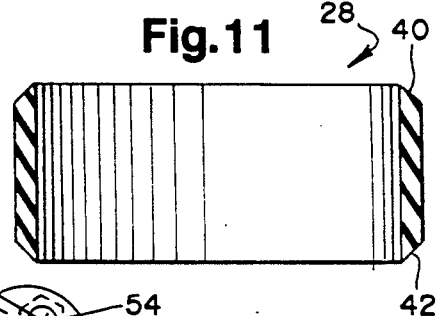
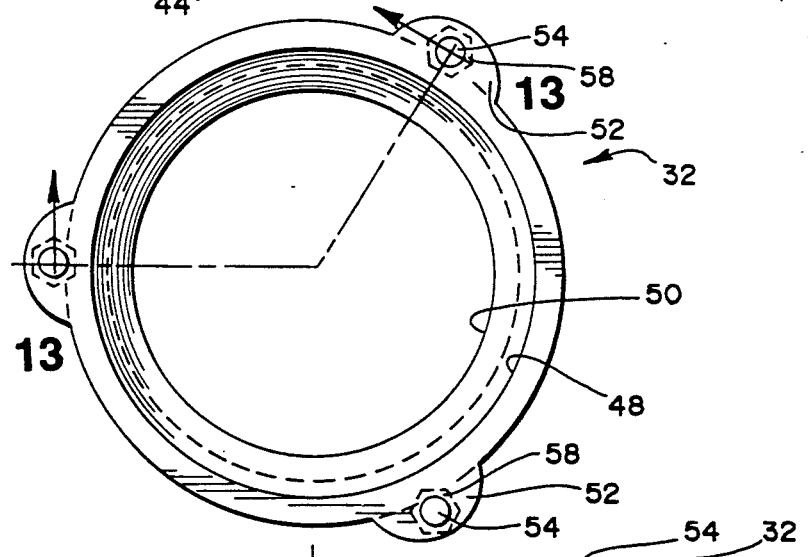
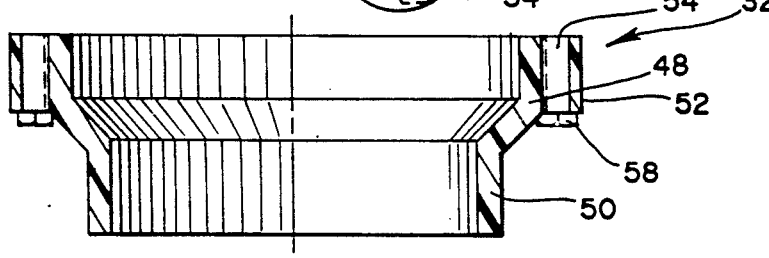

TELESCOPING CLOSET FLANGE

BACKGROUND OF THE INVENTION

This invention relates to the plumbing trade, and in particular to an improved apparatus and method for finishing a drain pipe so as to bring it even with the level of a poured concrete floor.

In residential and commercial construction, drain pipes are used to direct wastes from a sink or toilet into the sewer below. Where the sink or toilet is to be located over a concrete floor, a vertical drain pipe is installed prior to the pouring of the concrete floor. After the concrete floor has been poured, the drain pipe usually extends several inches or more above the level of the concrete floor. It then becomes necessary to lower the level of the drain pipe to bring it even with the floor before the final plumbing work can be done.

The conventional method for bringing a drain pipe even with a concrete floor is difficult and time consuming. First, concrete is chiseled out from around the drain pipe to expose part of the pipe below floor level. Next, the pipe is cut off below floor level. Finally, a glued closet fitting is attached to the end of the pipe so as to bring the drain pipe even with the level of the concrete floor.

While this method has worked in the past, there exists a need for an easier and less time consuming way to finish a drain pipe so as to bring it even with the level of a concrete floor, particularly one that does not require chiselling out the concrete floor from around the drain pipe.

SUMMARY OF THE INVENTION

It is therefore a principal object of the invention to provide an improved apparatus and method for bringing the level of a drain pipe even with the level of a concrete floor. A related objective is to provide a telescoping closet flange which can bring the level of a drain pipe even with a concrete floor without chiselling out any concrete from around the drain pipe.

It is a further object of the invention to provide a telescoping closet flange which can be installed quickly and easily.

A still further object is to provide a telescoping closet flange which can be placed over the severed end of a drain pipe and slid up and down in telescoping fashion so as to bring the height of the pipe and flange even with the level of the floor.

Yet another object is to provide a telescoping closet flange that maintains a leakproof seal when attached to the end of a drain pipe.

THE DRAWINGS

FIG. 6 is a perspective view of the installed telescoping closet flange of FIG. 4;

FIG. 7 is an exploded perspective view of the telescoping closet flange of FIG. 4;

FIG. 8 is a plan view of the telescoping closet flange slide;

FIG. 9 is a cross-section of the telescoping closet flange slide taken along line 9—9 of FIG. 8;

FIG. 10 is a plan view of the telescoping closet flange seal;

FIG. 11 is a cross-section of the telescoping closet flange seal taken along line 11—11 of FIG. 10;

FIG. 12 is a plan view of the telescoping closet flange seal cap shown with fastening nuts in place; and FIG. 13 is a cross-section of the telescoping closet flange seal cap taken along line 13—13 of FIG. 12.

DETAILED DESCRIPTION OF THE INVENTION

Figure 1:
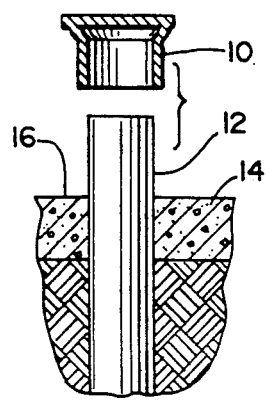
FIG. 1 is a cross-section of a conventional closet flange and drain pipe prior to installation of the flange.

Turning to the drawings, there is shown in FIG. 1 a conventional closet flange or closet fitting 10 and drain pipe 12 prior to installation of the closet flange 10. In the conventional building method, the vertical drain pipe 12 is installed prior to the pouring of the concrete floor 14. The drain pipe 12 usually extends several inches or more above the top 16 of the concrete floor 14.

Figure 2:
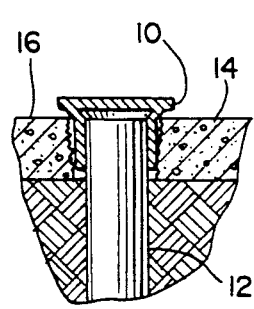
FIG. 2 is a cross-section of the conventional closet flange and drain pipe of FIG. 1 after installation of the flange.

FIG. 2 illustrates the conventional closet flange 10 after it has been installed onto the drain pipe 12. Prior to installing the conventional closet flange 10, it is necessary to chisel out the concrete 14 from around the pipe 12 to expose part of the pipe 12 below floor level 16. Next, the pipe 12 must be cut off below floor level 16. Finally, the conventional closet flange 10 is glued to the severed end of the drain pipe 12 so as to bring the drain pipe 12 even with the top 16 of the concrete floor 14.

This conventional method for bringing a drain pipe even with the level of a concrete floor is difficult and time consuming, primarily because it requires chiselling out the concrete around the drain pipe and cutting off a portion of the drain pipe prior to installing the closet flange. Consequently, a need exists for an easier and less time consuming way to bring a drain pipe even with the level of a concrete floor.

The method and apparatus I have invented for bringing a drain pipe even with the level of a concrete floor is illustrated in FIGS. 3-13. In my new improved method, after the vertical drain pipe 12 is installed and before the concrete 14 is poured, the drain pipe 12 is cut off up to about six inches below what will be the top 16 of the concrete floor 14. A spacer sleeve 18 (FIG. 3) is then installed onto the severed end of the drain pipe 12 so that one end 20 of the spacer sleeve 18 extends above what will be the top 16 of the concrete floor 14. Next, the concrete floor 14 is poured.

Figure 3:
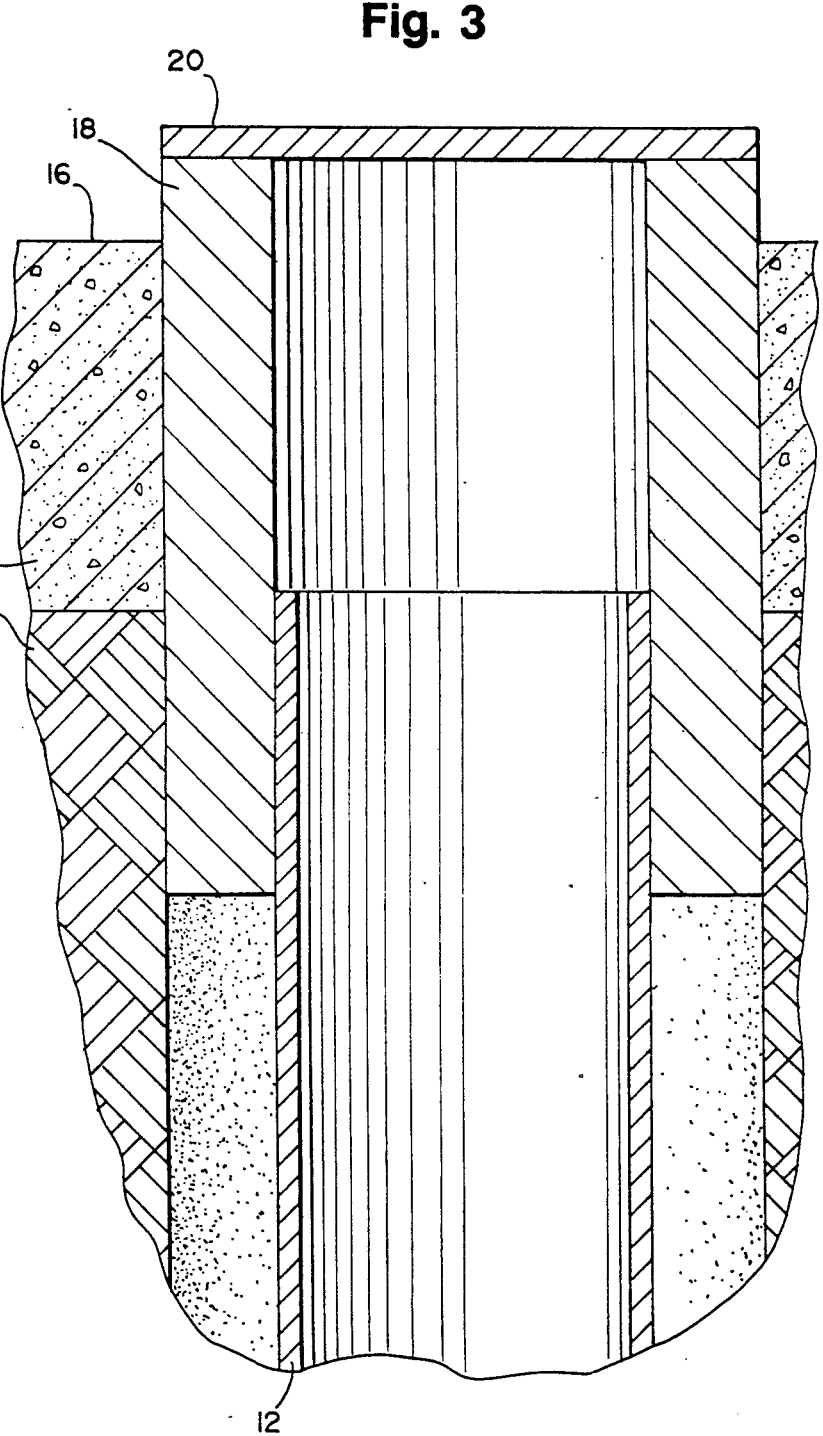
FIG. 3 is a cross-section of a concrete spacer sleeve fitted over a drain pipe.

FIG. 3 illustrates a cross-section of a concrete spacer sleeve 18 fitted over a drain pipe 12 after the concrete floor 14 has been poured. The spacer sleeve 18 extends above the top 16 of the concrete floor 14. The spacer sleeve 18 should be sized such that, when it is removed, sufficient space is left between the drain pipe 12 and the concrete floor 14 and between the drain pipe 12 and the ground 22 below the floor 14 to accommodate the telescoping closet flange 24 (shown in FIGS. 4-7).

After the spacer sleeve 18 is removed, the telescoping closet flange 24 is slid into the hole left by the spacer sleeve 18 and slid over the severed end of the drain pipe 12. The telescoping closet flange comprises a cylindrical body 26, a cylindrical seal 28, a cylindrical slide 30 and a cylindrical seal cap 32 held together by fastening means.

Figure 4:
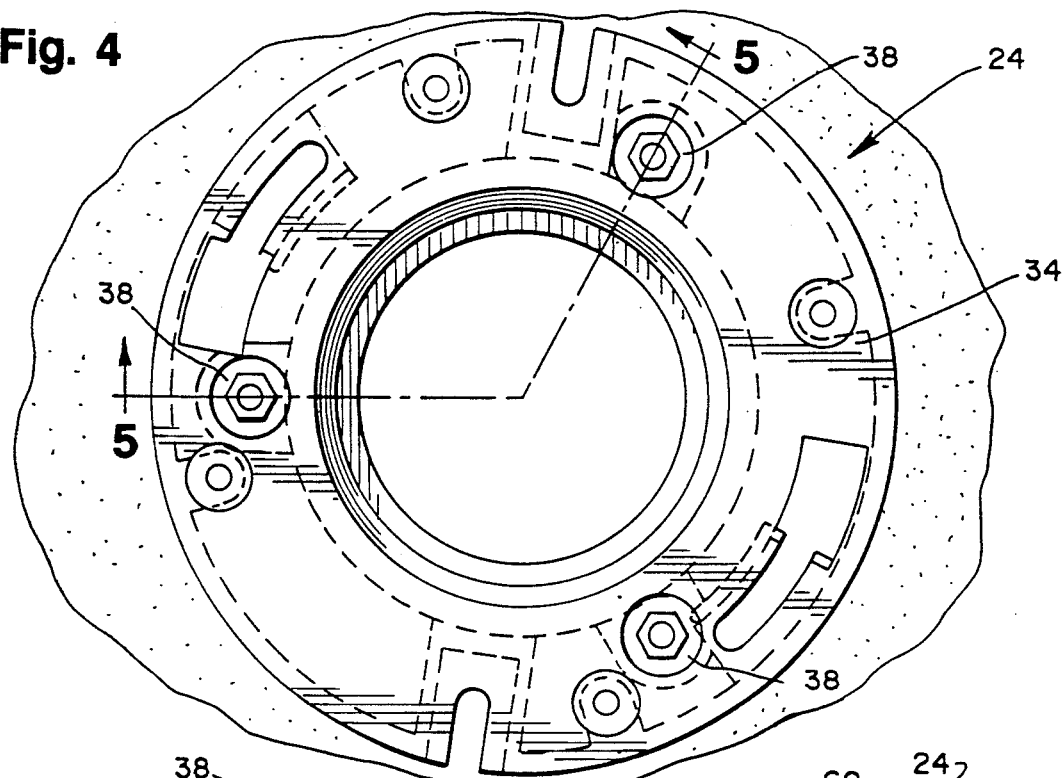
FIG. 4 is a plan view of the telescoping closet flange of the present invention shown installed over the drain pipe of FIG. 3 after the spacer sleeve has been removed.
Figure 5:
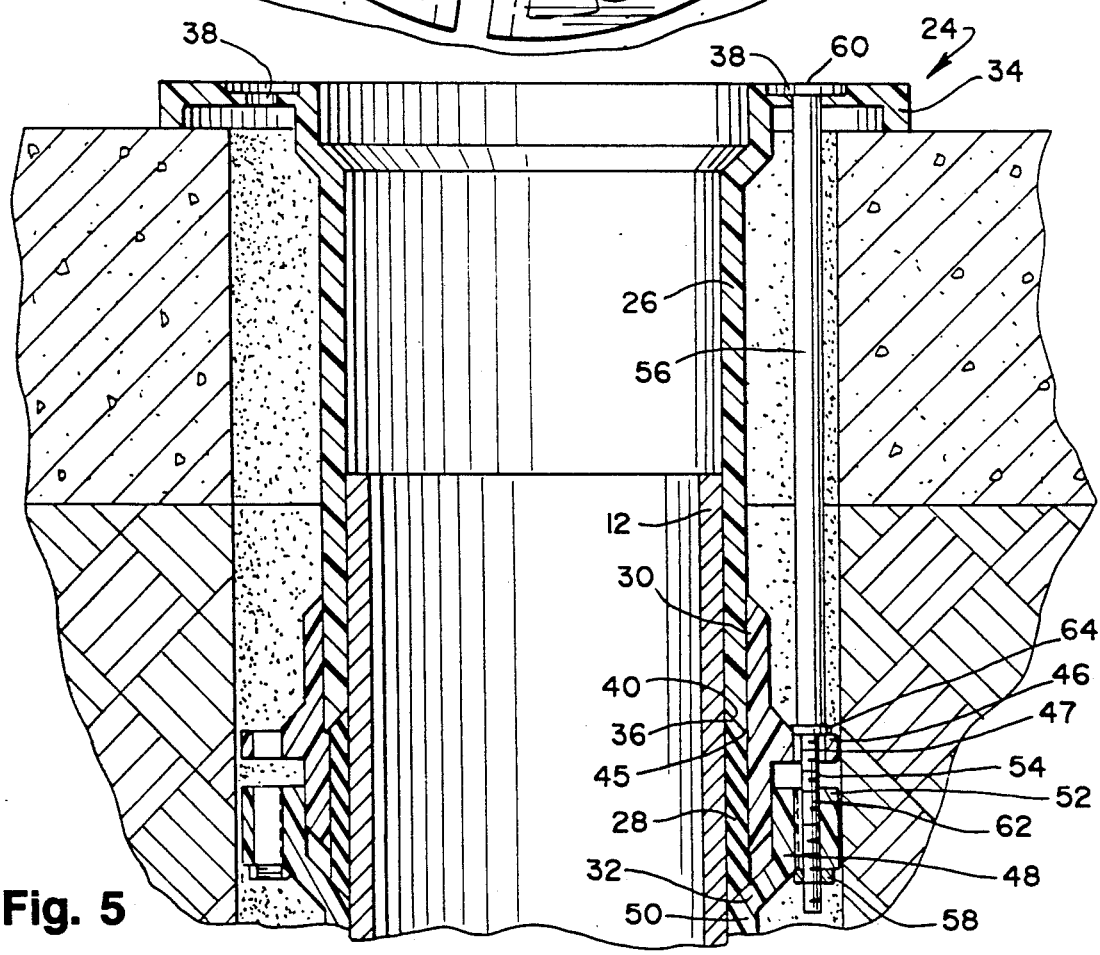
FIG. 5 is a cross-section of the telescoping closet flange of the present invention taken along line 5—5 of FIG. 4.

The cylindrical body 26 is sized to slide over the drain pipe 12 and has an outwardly extending rim 34 at one end and a beveled edge 36 at the opposite end. The rim 34 has a plurality of spaced apertures 38 circumferentially disposed for receiving fastening means. In the preferred embodiment, there are three such apertures 38 spaced 120 degrees apart as shown in FIG. 4. Preferably, the body 26 is molded of resilient plastic material from the group consisting of polyethylene, polypropylene and nylon.

The seal 28 is sized to fit snugly over the drain pipe 12 and has a beveled edge 40 which, in the assembled flange 24, is in water tight communication with the body beveled edge 36. The seal 28 is substantially cylindrical and, preferably, has both top and bottom beveled edges 40, 42 as shown in FIG. 11. In the assembled flange 24, the seal 28 is interposed between the body 26 and the seal cap 32 along its axial dimension and interposed between the slide 30 and the drain pipe 12 along its radial dimension.

In the assembled flange 24, the slide 30 is adjacent to the outer surfaces of the body 26 and the seal 28 (i.e. the surfaces facing away from the drain pipe 12) where the body 26 and seal 28 are in water tight communication. The slide 30 comprises two adjacent cylindrical portions 43, 44. One portion, designated number 43 in FIG. 9, has a slightly larger inside diameter than the other. The two portions 43, 44 come together to form a notch or ledge 45 circumferentially disposed along the inside surface of the slide 30. In the assembled flange 24, part of the body beveled edge 36 is seated inside this notch 45.

The slide 30 has at about its mid-section a plurality of radially outwardly extending tabs 46. Each of these tabs 46 has an aperture 47, best shown in FIG. 8, for receiving fastening means.

The seal cap 32 has a large diameter portion 48 and a small diameter portion 50. In the assembled flange 24, the large diameter portion 48 is adjacent to the outer surface of the slide 30 and the small diameter portion 50 is adjacent to the outer surface of the drain pipe 12. The large diameter portion 48 has a plurality of radially outwardly extending tabs 52 as illustrated in FIG. 12. Each of these tabs 52 also has an aperture 54 for receiving fastening means.

In the preferred embodiment, there are three apertures spaced about 120 degrees apart in both the slide 30 and seal cap 32, corresponding to the three apertures 38 in the body rim 34.

Upon installation, the flange assembly 24 is interconnected by fastening means, preferably three shoulder bolts 56 with corresponding nuts 58. The shoulder bolts 56 extend through the apertures 38, 47, 54 in the body 26, the slide 30 and the seal cap 32 respectively. Each shoulder bolt 56 comprises a hexagonal head 60 at one end and a threaded section 62 at the opposite end. In the assembled flange 24, washers 64 are interposed between the non-threaded section of the shoulder bolts 56 and the slide 30, preventing upward movement of the slide 30. Nuts 58 are threaded onto the threaded ends 62 of the shoulder bolts 56.

The shoulder bolts are tightened by turning the hexagonal heads 60 with a socket wrench or other appropriate tool. As the shoulder bolts 56 are tightened, the seal cap 32 is drawn toward the body 26, compressing the seal 28 between them. This action provides a water tight interface between the top edge 40 of the seal 28 and the body beveled edge 36.

As the seal 28 is compressed in the axial direction between the body 26 and the seal cap 32, the seal 28 distends slightly in the radial direction, exerting pressure on the drain pipe 12 and the slide 30. This action provides a water tight interface between the seal 28 and the drain pipe 12.

Prior to tightening the fastening means, the telescoping closet flange 24 can be slid up or down the drain pipe 12 in a telescoping fashion to bring the level of the drain pipe 12 and flange 24 even with the level of a concrete floor 14. Tightening the flange assembly 24 provides a leakproof seal between the flange 24 and the pipe 12.

Of course, many modifications and other embodiments of the invention will be recognized by one skilled in the art in view of the foregoing teachings. Therefore, the invention is not to be limited to the exact construction and operation described, and any suitable modifications are to be included within the scope of the claims allowed herein.

I claim as my invention:

1. A telescoping closet flange assembly for extending a drain pipe to floor level, said flange assembly characterized by:

a cylindrical body sized to slide over the drain pipe and having a radially outwardly extending rim at one end and a beveled edge at the opposite end, said rim having a plurality of spaced apertures circumferentially disposed for receiving fastening means, a cylindrical seal sized to fit snugly over said drain pipe and having a beveled edge in water tight communication with said body beveled edge, a cylindrical slide adjacent to the outer surfaces of said body and said seal where said body and said seal are in water tight communication, and having at about its mid-section a plurality of radially outwardly extending tabs, each of said tabs having an aperture for receiving fastening means, and a cylindrical seal cap having a large diameter portion adjacent to the outer surface of said slide and a small diameter portion adjacent to the outer surface of said drain pipe, said large diameter portion having a plurality of radially outwardly extending tabs, each of said tabs having an aperture for receiving fastening means.

2. The flange assembly of claim 1 in which said slide further comprises a large diameter portion, an adjacent small diameter portion, and a notch circumferentially disposed along the inside of said slide at the interface of said large and small diameter portions, wherein a portion of said body beveled edge is seated inside said notch.

3. The flange assembly of claim 1 in which said body, slide and seal cap are interconnected by said fastening means.

4. The flange assembly of claim 3 in which said fastening means comprises shoulder bolts and nuts.

5. The flange assembly of claim 1 in which said body is molded of resilient plastic material selected form the group consisting of polyethylene, polypropylene and nylon.

6. In combination, the flange assembly of claim 1 connected to a drain pipe.

7. A method for extending a drain pipe to the level of a concrete floor comprising the steps of:
cutting the drain pipe up to about six inches below the top of the concrete floor,
installing a spacer sleeve onto the severed end of the drain pipe so that one end of the spacer sleeve extends a over the top of the concrete floor,
pouring the concrete floor,
removing the spacer sleeve after the concrete sets,
sliding a telescoping closet flange assembly according to claim 1 into the hole left by the spacer flange and over the severed end of the drain pipe, and
tightening the fastening means.

* * * * *